United States Patent [19]

Halls

[11] E Re. 30,056

[45] Reissued Jul. 31, 1979

[54] CROP HARVESTING MACHINE HEADER SUSPENSION SYSTEM

[75] Inventor: Lawrence M. Halls, New Holland, Pa.

[73] Assignee: Sperry Rand Corporation, New Holland, Pa.

[21] Appl. No.: 898,745

[22] Filed: Apr. 21, 1978

Related U.S. Patent Documents

Reissue of:

[64] Patent No.: 3,959,957
Issued: Jun. 1, 1976
Appl. No.: 544,028
Filed: Jan. 24, 1975

[51] Int. Cl.[2] ..... A01D 47/00

[52] U.S. Cl. ..... 56/208; 56/15.8; 56/DIG. 1

[58] Field of Search ..... 56/15.8, 208, DIG. 1, 56/192, 15.9, 209

[56] References Cited

U.S. PATENT DOCUMENTS

| | | | |
|---|---|---|---|
| 2,807,127 | 9/1957 | Scheidenhelm | 56/208 X |
| 3,545,186 | 12/1970 | Glass | 56/DIG. 1 |
| 3,699,754 | 10/1972 | Koch et al. | 56/DIG. 1 |
| 3,780,508 | 12/1973 | Tashiro | 56/208 |
| 3,834,142 | 9/1974 | Johnston et al. | 56/377 |

*Primary Examiner*—Jay N. Eskovitz
*Attorney, Agent, or Firm*—John B. Mitchell; Frank A. Seemar; Ralph D'Alessandro

[57] ABSTRACT

A crop harvesting machine has a mobile frame adapted to move across a field, an elongated crop material harvesting header and an improved pair of assemblies laterally spaced apart along the frame for suspending the header from the frame. Each of the assemblies includes a lower link pivotally interconnecting a lower portion of the header and a lower portion of the frame and an upper link pivotally mounted on an upper frame portion and having front and rear portions which respectively extend forwardly and rearwardly from the location of pivotal mounting of the upper link on the upper frame portion. The front portion of each upper link is pivotally connected to an upper header portion. Each of the assemblies further includes a resilient spring coupled to the rear portion of one upper link and extending therefrom downwardly and coupled to the lower frame portion so as to counterbalance the weight of the header and thereby support the header in an operating position relative to the field, while at the same time enable the header to floatingly follow the contour of the field, as the mobile frame moves across the field.

17 Claims, 5 Drawing Figures

CROP HARVESTING MACHINE HEADER SUSPENSION SYSTEM

Matter enclosed in heavy brackets [ ] appears in the original patent but forms no part of this reissue specification; matter printed in italics indicates the additions made by reissue.

CROSS REFERENCES TO RELATED APPLICATIONS

Reference is hereby made to the following co-pending U.S. applications dealing with related subject matter and assigned to the assignee of the present invention.

1. "Pull-Type Crop Harvesting Machine Disposable at a Plurality of Offset Harvesting Positions Behind a Towing Vehicle" by Lawrence M. Halls, U.S. Ser. No. 544,027, filed Jan. 24, 1975.
2. "Crop Harvesting Machine Convertible Between Field Operating and Road Transporting Orientations" by Lawrence M. Halls et al., U.S. Ser. No. 544,029, filed Jan. 24, 1975.

BACKGROUND OF THE INVENTION

1. Field of the Invention

The present invention relates generally to a crop harvesting machine and, more particularly, is concerned with an improved system for suspending a crop material harvesting header on the harvesting machine frame.

2. Description of the Prior Art

Prior art crop harvesting machines, such as mower-conditioners, windrowers, swathers or the like, incorporate assemblies for suspending the header of the machine from the machine frame. These suspension assemblies commonly include upper and lower links pivotally interconnecting and extending between the header and the frame, and resilient springs usually positioned between the header and frame and coupling the machine frame with either the lower links or some lower part of the header itself for providing flotation of the header from the frame. While these prior art machines are generally satisfactory for their intended purposes, improvement in header suspension and floatation from the machine frame is desirable to enhance the over-all performance and versatility of the machine under varying field conditions, for example, uneven field contours or terrain.

SUMMARY OF THE INVENTION

The header suspension system of the present invention improves the performance of the header of the harvesting machine in uneven field terrain conditions by maximizing the upwardly-directed forces being imposed to provide floatation of the header on the field. Whenever field obstructions and surface irregularities are impacted by the header, such maximized forces cause the header to quickly react and move upwardly to clear such obstructions and irregularities.

Accordingly, the present invention broadly relates to a crop harvesting machine having a mobile frame adapted to move across a field and an elongated crop material harvesting header wherein an improved pair of assemblies laterally spaced along the frame is provided for suspending the header from the frame.

Each of the assemblies includes lower means pivotally mounting a lower portion of the header to a lower portion of the frame and upper means pivotally mounting an upper portion of the header to an upper portion of the frame. The upper means is pivotally mounted on the upper frame portion and has first and second portions which respectively extend in generally opposite directions from the location of pivotal mounting of the upper means on the upper frame portion. The first portion of the upper means is pivotally connected to the upper header portion. Also, each assembly includes resilient means coupled to the second portion of the upper means and extending therefrom generally downwardly and coupled to the lower frame portion so as to counterbalance the weight of the header and thereby support the header in an operating position relative to the field, while at the same time enable the header to floatingly follow the contour of the field, as the mobile frame moves across the field.

*The improved header suspension system of the present invention further includes the innovative relocation of operative elements which greatly enhances the flotation characteristics of the header. The conditioner rolls which have traditionally been a part of the header are relocated to the main frame, thus significantly reducing the mass of the header and producing a corresponding reduction in header impact and/or controlled reaction time. The header mass is further reduced by this relocation due to concomitant roll drive system changes.*

More specifically, the present invention also relates to other improved features which compliment the aforementioned improved header suspension system for crop harvesting machines. Two embodiments of crop harvesting machines are disclosed herein which incorporate the aforementioned header suspension system as well as other improved features in combination therewith which further enhance the overall machine performance.

Advantages and attainments of all these improvements will become apparent to those skilled in the art upon a reading of the following detailed description when taken in conjunction with the drawings in which there is shown and described illustrative embodiments of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machines and facing in the direction of forward travel. Also, in the following description, it is to be understood that such terms as "forward," "left," "upwardly," etc., are words of convenience and are not to be construed as limiting terms.

PREFERRED EMBODIMENT OF THE MACHINE

Figure 1:
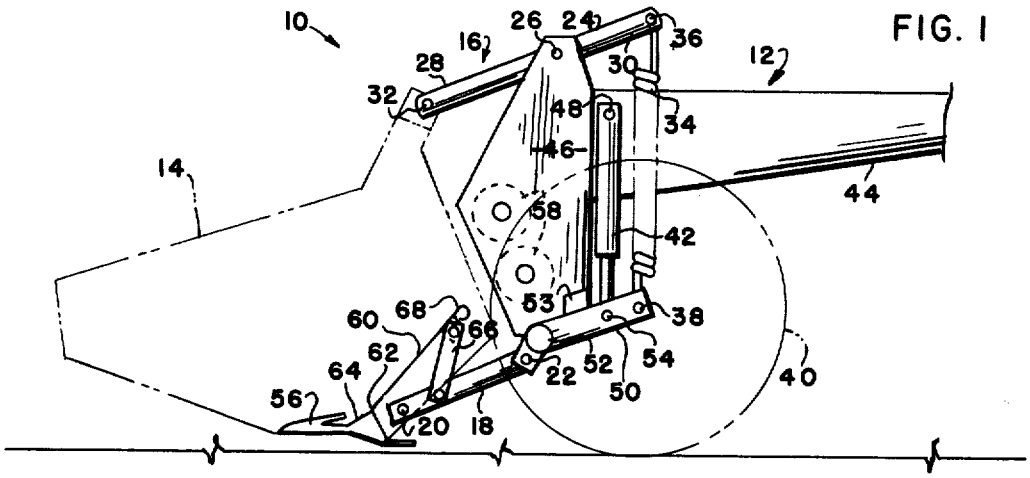
FIG. 1 is a fragmentary right side elevational view of the preferred embodiment of a crop harvesting machine incorporating the principles of the present invention, showing the machine header in a lowered position.
Figure 2:
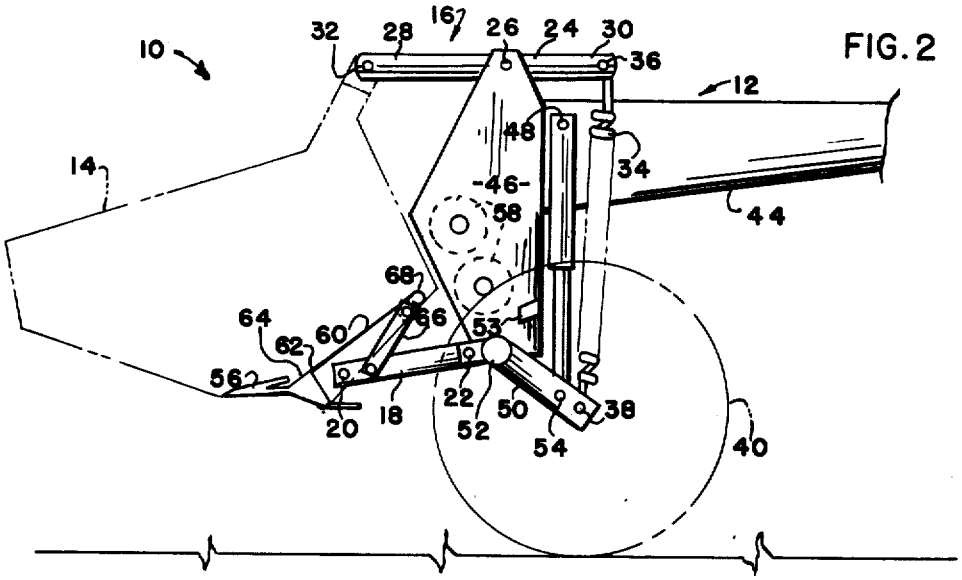
FIG. 2 is a fragmentary right side elevational view similar to that of FIG. 1, but showing the machine header in a raised position.
Figure 3:
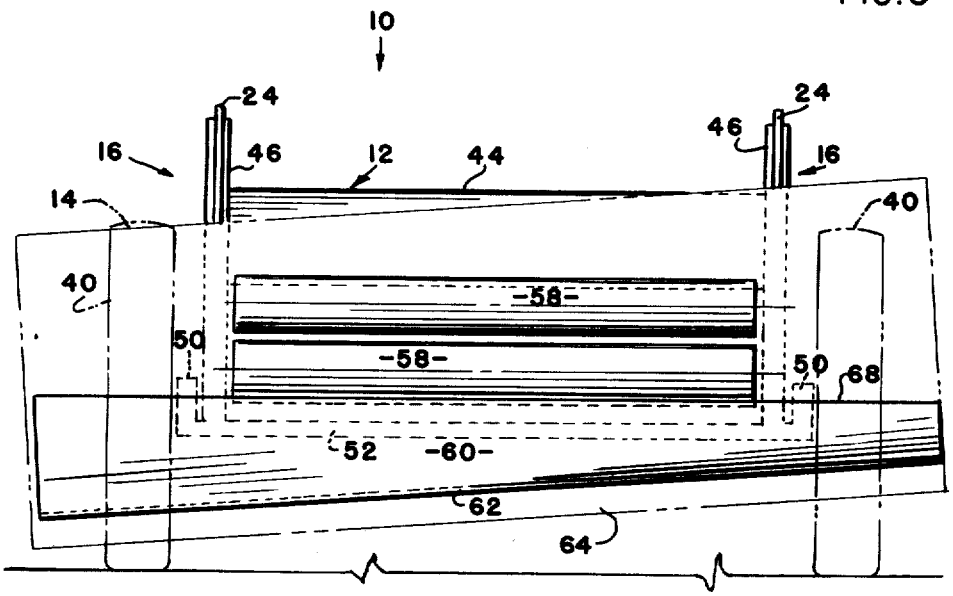
FIG. 3 is a front elevational view of the machine of FIG. 1, showing one lateral end of the header raised relative to the other end due to contact by the one end with a field obstacle or irregularity.

Referring now to the drawings, and particularly to FIGS. 1 through 3, there is partially shown the preferred embodiment of a crop harvesting machine, indicated generally by numeral 10, incorporating the principles of the present invention (the forward left side of the machine being shown in FIGS. 1 and 2 when one is standing to the rear of the machine and facing in the direction of forward travel). While the machine 10 is of the self-propelled type, the improved features incorporated therein may just as readily be incorporated into a pull-type machine.

The machine 10 is provided with a mobile frame, generally designated 12, adapted to move forwardly across a field and an elongated header 14 disposed forwardly of the frame 12 and extending transversely to the forward direction (as best seen in the front view of the machine shown in FIG. 3) for harvesting crop material from the field as the mobile frame 12 advances forwardly.

An improved system for suspending the header 14 on the frame 12 is incorporated by the machine 10 and comprises two suspension assemblies 16 (FIG. 3) laterally spaced along the forward portion of the frame 12, with only the left assembly 16 being shown in FIGS. 1 and 2. The following description of the left assembly 16 will suffice for a complete understanding of this improved system, since the two assemblies are identical in structure and operation and, therefore, such description is equally applicable to the right assembly.

Each suspension assembly 16 includes a pair of vertically spaced apart lower and upper means pivotally mounting the header 14 at respective lower and upper portions thereof to respective lower and upper portions of the frame 12. The lower means comprises an elongated link 18 pivotally connected to the lower header portion at 20 and to the lower frame portion at 22. The upper means comprises an elongated arm 24 being pivotally mounted on the upper frame portion at 26 and having front and rear portions 28, 30 which respectively extend forwardly and rearwardly from the location 26. The forward end of front portion 28 of arm 24 is pivotally connected to the upper header portion at 32. Resilient means in the form of a spring 34 is also provided by each of the suspension assemblies 16. The spring 34 is coupled at one end to the rearward end of rear arm portion 30 at 36 and extends therefrom generally downwardly and is coupled at its opposite end to the lower frame portion at 38. By such arrangement, the springs 34 of the assemblies 16 yieldably counterbalance the weight of the header 14 and thereby support the header 14 in an operating position relative to the field, while at the same time enable the header 14 to floatingly follow the contour of the field, as the mobile frame moves across the field.

In addition to the advantage provided by the improved suspension system cited hereinabove, the above-described arrangement of the upper arms 24 and the springs 34 in relation to the header 14 allow the employment of low rate type of springs which provide a lesser amount of reduction in spring lifting assistance to the header as the header moves upwardly upon encountering a field obstacle and thereby impose more uniform constant floatation force on the header or, in another sense, more uniform pressure of the header on the ground, as it follows the uneven field terrain. In contrast to the prior art suspension system wherein the springs are generally disposed in the narrow spacing between the header and the frame and, therefore, are usually higher rate types of springs which characteristically bottom out earlier and thereby undesirably impose non-uniform, decreasing floatation force on the header as the header moves upwardly, the space geometry limitations between the header 14 and frame 12 of the machine 10 do not impose restrictions on the type of spring which may be utilized where the springs are positioned rearwardly of the location of header mounting to the frame, as in the improved suspension system of the present invention.

According to another improved feature of the machine 10, the lower portion of the mobile frame 12 mounts a pair of rotatable ground engaging wheels 40 (only the left one being shown in broken line form) and is pivotally mounted to the upper portion of the mobile frame 12 about a generally horizontal axis. Lift means in the form of at least one hydraulic cylinder 42 is interconnected between the lower and upper frame portions and actuatable through suitable hydraulic controls (not shown) for clockwise pivoting of the lower frame portion relative to the upper frame portion to effect upward lifting of the upper frame portion relative to the field. Also, upon pivoting the lower frame portion relative to the upper frame portion in the clockwise direction when the cylinder 42 is extended, the resilient spring 34 is being coupled between the rear arm portion 30 of the suspension assembly 16 and the lower frame portion causes concurrent pivoting of the upper arm 24 also in a clockwise direction and thereby upward lifting of the header 14 relative to the upper frame portion, as well as the field, such that the header 14 is lifted upwardly from the field at a faster rate than the upper frame portion.

The upper frame portion includes a transverse main structure 44, which in the self-propelled form of the machine 10 constitutes the base of the power unit, and a pair of vertically extending side structures 46 located near the forward end of the main structure 44, fixed to its respective opposite sides and extending generally downwardly therefrom. The upper arms 24 of the suspension assemblies 16 are preferably pivotally mounted on the upper ends of the side structures 46 which ends extend above the main structure 44. The hydraulic cylinder 42 is anchored at its cylinder end at 48 to one side of the main structure 44 rearwardly of the respective one of the side structures 46.

The lower frame portion includes a pair of wheel arms 50 each being connected at a forward end to a cross tubular member 52 pivotally mounted between and extending outwardly from the lower ends of the side structures 46. Also, each forward end of the arms 50 is pivotally connected to the rear end of one of the lower links 18. Each wheel arm 50 at its rearward end rotatably mounts one of the ground engaging wheels 40 at location 38 where the lower end of a respective one of the resilient floatation springs 34 is secured. When the header 14 is in its lowered position of FIG. 1, the upper side of each wheel arm 50 rests against the underside of a stop 53 fixed on each of the side structures 46. The piston rod end of the hydraulic cylinder 42 is pivotally connected to the one wheel arm 50 (the left one as seen in FIGS. 1 and 2) at 54 between the forward and rearward ends of the arm 50. By such arrangement, it is seen that the cylinder 42 is interposed between the side structure 46 and the resilient floatation spring 34 and generally extends parallel to the spring 34.

The header 14 includes conventional crop treating or harvesting elements, such as a sickle bar 56 and a converging reel (not shown). The standing crop material is cut and delivered rearwardly by these elements as the mobile frame 12 of the machine 10 advances forwardly across the field. A pair of upper and lower elongated rolls 58 are generally horizontally and rotatably mounted between the side structures 46 of the upper frame portion rearwardly of the header 14 and rotatably driven in opposite directions by conventional drive means (not shown). The rolls 58 receive the crop material, as it is moved rearwardly through an opening in the rear side of the header 14 by the crop treating elements thereof, and conditions the crop material as it moves rearwardly into a bite defined between the rolls 58. From the rolls 58, the conditioned crop material is deposited in a swath or windrow back on the field.

The header 14 also incorporates an improved arrangement for guiding the crop material being delivered rearwardly to the conditioning rolls 58 even during when the header 14 moves upwardly upon encountering a field obstacle. The arrangement includes an elongated flexible floor section 60 comprising a portion of the bottom of the header 14. The floor section 60 is pivotally mounted about a horizontal axis along its forward longitudinal edge defined at 62 to a permanent floor section 64 of the header 14. Each of a pair of links 66 is fixed to one of the lower links 18 so as to extend in rearwardly inclined relationship therefrom and pivotally connected to the floor section 60 for pivoting the floor section 60 about its axis and thereby maintaining the plane of the floor section 60 generally aligned with the bit of the conditioning rolls 58 irregardless of the vertical position of the header 14. Therefore, the harvested crop material will be delivered to the bite of the conditioning rolls 58 although the header 14 is floatingly following uneven field contours as the machine 10 moves across the field. Furthermore, such alignment is maintained even though one lateral end of the header 14 is at a different elevation from the field than the other end, as seen in FIG. 3. The flexibility of floor section 60 allows it to twist such that its rear longitudinal edge 68 remains substantially horizontal although its forward longitudinal edge 62 extends at a slight acute angle to the horizontal.

OTHER EMBODIMENT OF THE MACHINE

Figure 4:
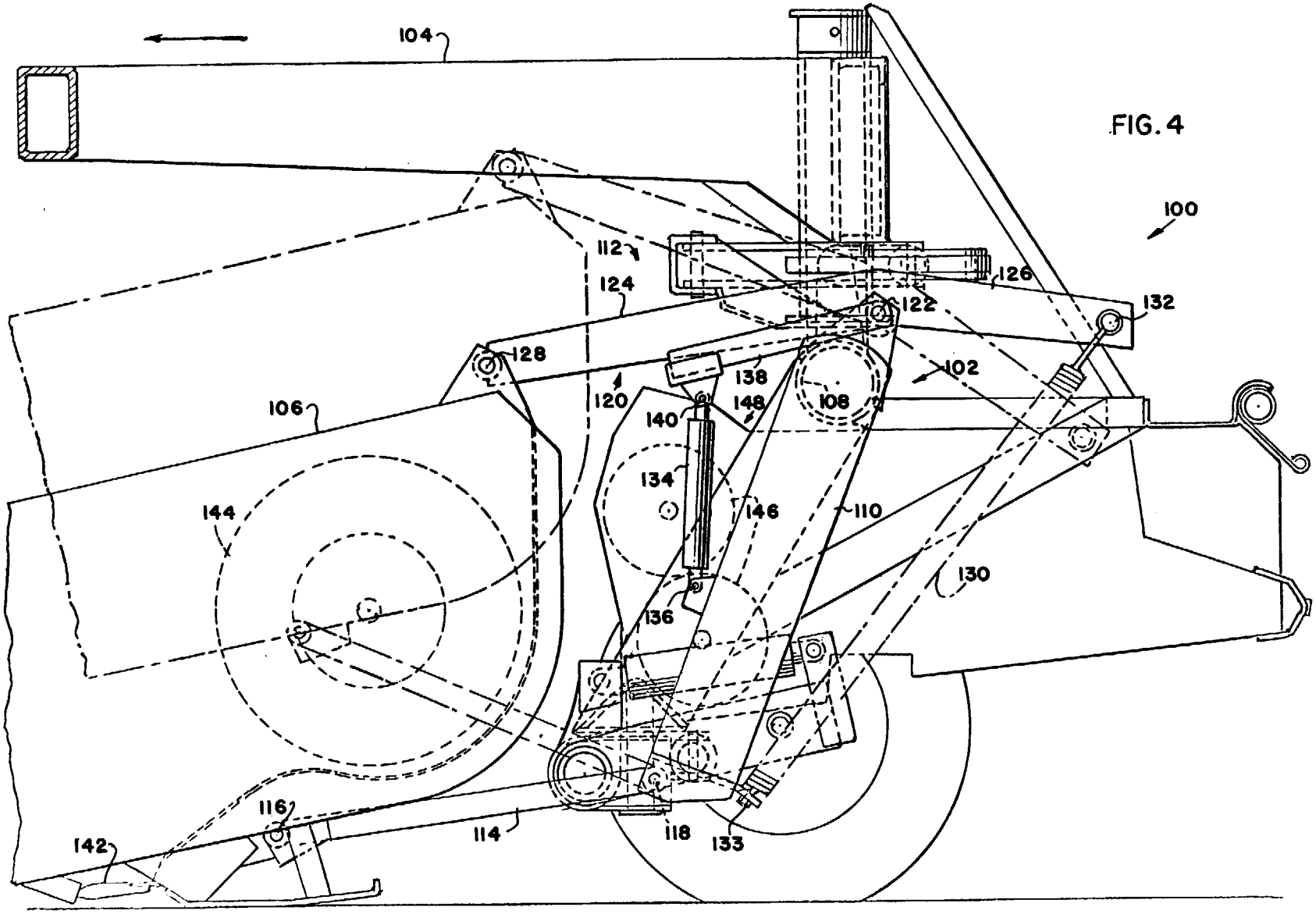
FIG. 4 is a right side elevational view of another embodiment of a crop harvesting machine incorporating the principles of the present invention, showing the machine header in solid line in a lowered position and in broken line in a raised position.
Figure 5:
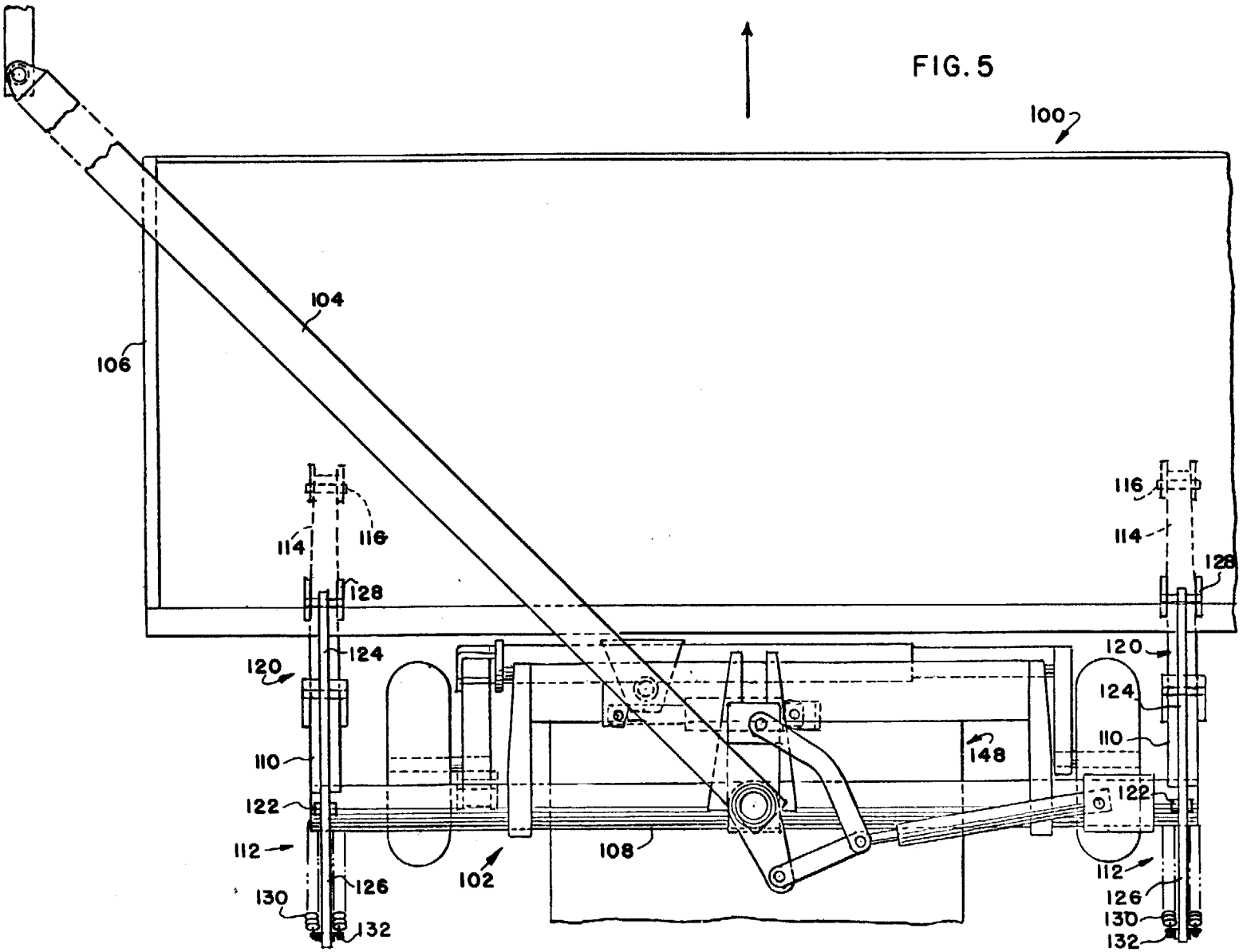
FIG. 5 is a plan view of the machine of FIG. 4, but on a slightly smaller scale.

Referring now to FIGS. 4 and 5, there is shown another embodiment of a crop harvesting machine, indicated generally by numeral 100, incorporating the principles of the present invention (the left side of the machine being shown in FIG. 4 when one is standing to the rear of the machine and facing in the direction of forward travel).

The machine 100 is a pull-type unit having a mobile frame, generally designated 102, and a draft member 104 pivotally attached at its rear end to the frame 102 and adapted at its forward end for pivotal attachment to a tractor or other vehicle for towing the frame forwardly across a field. An elongated header 106 is disposed forwardly of the frame 102 and extends transversely to the forward direction beneath the draft member 104 for harvesting crop material from the field as the mobile frame 102 advances forwardly behind the towing vehicle.

The frame 102 includes a main tubular member 108 which extends transversely to the forward direction and pivotally mounts the draft member 104 at a central location therealong. A pair of side members 110 are fixed to the respective opposite ends of the tubular member 108 and similarly extend in an inclined manner downwardly and forwardly therefrom.

An improved system for suspending the header 106 on the frame 102 is incorporated by the machine 100, the arrangement of which is generally similar to that described above with respect to machine 10. The system is comprised by two suspension assemblies 112 (FIG. 5) laterally spaced along the forward side of the frame 102, with only the left assembly 112 being shown in FIG. 4. The following description of the left assembly 112 will suffice for a complete understanding of this improved system, since the two assemblies are identical in structure and operation and, therefore, such description is equally applicable to the right assembly 112.

Each suspension assembly 112 includes a pair of vertically spaced apart lower and upper means pivotally mounting the header 106 at respective lower and upper portions thereof to respective lower and upper portions of the frame 102. The lower means comprises an elongated link 114 pivotally connected to the lower header portion at 116 and to the lower frame portion, such being the lower end of the side member 110, at 118. The upper means comprises an elongated arm 120 being pivotally mounted on the upper frame portion, such being one outer end of the tubular member 108, at 122 and having front and rear portions 124, 126 which respectively extend forwardly and rearwardly from the location 122. The forward end of front portion 124 of arm 120 is pivotally connected to the upper header portion at 128. Resilient means in the form of a spring (or a pair of springs if desired) 130 is also provided by each of the suspension assemblies 112. The spring 130 is coupled at one end to the rearward end of rear arm portion 126 at 132 and extends therefrom generally downwardly and is coupled at its opposite end to the lower frame portion, such being the lower end of the side member 110, at 133. By such arrangement, the springs 130 of the assemblies 112 yieldably counterbalance the weight of the header 106 and thereby support the header 106 in an operating position relative to the field (as shown in solid line form in FIG. 4), while at the same time enable the header 106 to floatingly follow the contour of the field, as the mobile frame 102 is towed across the field.

The suspension assemblies 112 also provide the additional advantage described earlier with respect to the suspension system of machine 10 by the abovedescribed arrangement of the upper arms 120 and the springs 130 which is substantially identical to that of the arms 24 and springs 34 of the system incorporated by machine 10.

According to another improved feature of the machine 100, lift means in the form of at least one hydraulic cylinder 134 is provided being mounted on the frame 102 and being actuatable through suitable hydraulic controls (not shown) to effect upward lifting of the header 106 relative to the frame 102 and the field for positioning the header 106 in a raised, non-operating position. Specifically, the cylinder 134 is pivotally anchored at its cylinder end at 136 to one of the frame side members 110 generally intermediately along its length. A support member 138 is pivotally connected at its rear end to the frame tubular member at 122 and extends therefrom forwardly so as to underlie the front portion 124 of one arm 120. The cylinder 134 is pivotally connected at its piston rod end at 140 to the forward end of the support member 138. Upon extension of the cylinder 134, it pivots the support member 138 in a clockwise direction and thereby forces it against the underside of the front arm portion 124 which in turn causes clockwise pivoting of the arm 120 and thereby upward lifting of the header 106 to its raised, non-operating position, as illustrated in broken line form in FIG. 4.

The header 106 includes conventional crop treating or harvesting elements, such as a sickle bar 142, a reel (not shown) and a converging auger 144. The standing crop material is cut and delivered rearwardly by these elements as the machine 100 is towed forwardly across the field. A pair of upper and lower elongated rolls 146 are generally horizontally and rotatably mounted by housing structure 148 which is fixed at its upper end to the frame tubular member 108 and extends below it rearwardly of the header 106. The rolls 146 are rotatably driven in opposite directions by conventional drive means (not shown). The rolls 146 receive the crop material, as it is moved rearwardly through an opening in the rear side of the header 106 by the crop treating elements thereof, and conditions the crop material as it moves rearwardly into a bite defined between the rolls 146. From the rolls 146, the conditioned crop material is deposited in a swath or windrow back on the field.

It is thought that the invention and many of its attendant advantages will be understood from the foregoing description and it will be apparent that various changes may be made in the form, construction and arrangement of the parts of the machines described without departing from the spirit and scope of the invention or sacrificing all of its material advantages, the form hereinbefore described being merely exemplary embodiments thereof.

Having thus described the invention, what is claimed is:

1. In a crop harvesting machine of the type which includes a mobile frame adapted to move across a field and an elongated crop material harvesting header, an improved pair of assemblies laterally spaced apart along said frame for suspending respective opposite lateral ends of said header from said frame, each of said assemblies comprising:

lower means pivotally mounting a lower portion of one of said opposite lateral ends of said header to a lower portion of said frame;

an elongated arm pivotally mounting an upper portion of one of said opposite lateral ends of said header to an upper portion of said frame, said arm being pivotally mounted at an intermediate portion thereof on said upper frame portion and having first and second portions on either side of said intermediate portion which respectively extend in general alignment with but in generally opposite directions from the location of pivotal mounting of said arm on said upper frame portion, said first portion of said arm being pivotally connected to said upper portion of said respective one of said opposite lateral ends of said header; and resilient means coupled to said second portion of said arm and extending therefrom generally downwardly and coupled to said lower frame portion so as to counterbalance the weight of said respective one of said opposite lateral ends of said header and thereby support said respective one header opposite lateral end in an operating position relative to the field, while at the same time enable said respective one header opposite lateral end to vertically move relative to the other header opposite lateral end and floatingly follow the contour of the field independently of said other opposite lateral end, as said mobile frame moves across the field.

2. The machine as recited in claim 1, wherein said lower means comprises an elongated link interconnecting said lower portion of one of said lateral ends of said header and said lower frame portion.

3. The machine as recited in claim 1, wherein said resilient means comprises spring means.

4. A crop harvesting machine, comprising:

a mobile frame adapted to move across a field;

an elongated header for harvesting crop material from the field;

lower link means pivotally interconnecting a lower portion of said header and a lower portion of said frame;

upper link means pivotally interconnecting an upper portion of said header and an upper portion of said frame, said upper link means being pivotally mounted on said upper frame portion and having first and second portions which respectively extend in generally opposite directions from the location of pivotal mounting of said upper link means on said upper frame portion, said first portion being pivotally connected to said upper header portion;

resilient means coupled to said second portion of said upper link means and extending therefrom generally downwardly and coupled to said lower frame portion so as to counterbalance the weight of said header and thereby support said header in an operating position relative to the field;

means mounted on said frame and being actuatable to effect upward lifting of said header relative to the field for positioning said header in a raised, non-operating position;

said lower frame portion mounts rotatable ground engaging wheels and is pivotally mounted to said upper frame portion about a generally horizontal axis;

said resilient means is coupled between said second portion of said upper link means and said lower frame portion so as to cause pivoting of said upper link means and thereby upward lifting of said header relative to said field upon pivoting of said lower frame portion relative to said upper frame portion in a first predetermined direction; and said lift means is disposed between said upper frame portion and said lower frame portion and actuatable for pivoting said lower frame portion relative to said upper frame portion in said first predetermined direction.

5. The machine as recited in claim 4, wherein:

said lower frame portion is normally disposed in a predetermined position relative to said upper frame portion such that said pivoting of said lower frame portion from said predetermined position relative to said upper frame portion in said first predetermined direction causes upward lifting of said upper frame portion relative to the field and, via said resilient means, concurrently causes pivoting of said upper link means and thereby upward lifting of said header relative to said upper frame portion, whereby said header is lifted upwardly from the field at a faster rate than said upper frame portion.

6. The machine as recited in claim 4, wherein said lift means comprises a hydraulic cylinder.

7. A crop harvesting machine, comprising:

a mobile frame adapted to move across a field in a forward direction, said frame including a main portion extending transversely to said forward direction and a pair of spaced apart side portions being respectively fixed to said frame main portion and extending generally downwardly therefrom;

an elongated header disposed forwardly of said frame and extending transversely to said forward direction for harvesting crop material from the field as said mobile frame advances forwardly;

a pair of spaced apart lower links respectively pivotally interconnecting corresponding lower opposite lateral end portions of said header and lower parts of said frame side portions, each one of said lower links being pivotally movable independently of the other;

a pair of spaced apart upper links respectively pivotally interconnecting corresponding upper opposite lateral end portions of said header and parts of said frame, said latter frame parts being located adjacent where said frame side portions are fixed to said frame main portion, each one of said upper links being pivotally mounted on one of said respective frame parts for movement independent of the other and having front and rear portions which respectively extend forwardly and rearwardly from said one frame part, said front portion of each upper link being pivotally connected to one of said upper opposite lateral end portions of said header; and a pair of resilient means, each being coupled to said rear portion of one of said upper links and extending therefrom generally downwardly and coupled to said lower part of one of said frame side portions so as to counterbalance the weight of a respective one of said opposite lateral end portions of said header and thereby support said respective one lateral end portion of said header in an operating position relative to the field, while at the same time enable said respective one lateral end portion of said header to vertically move relative to the other lateral end portion thereof and floatingly follow the contour of the field, as said mobile frame moves across the field.

8. The machine as recited in claim 7, wherein said upper links each comprises an elongated arm interconnecting said respective upper header portion, said respective frame part and said respective resilient means.

9. The machine as recited in claim 7, wherein:

said header delivers said crop material rearwardly; and a pair of upper and lower elongated rolls is generally horizontally mounted on said frame transversely to said forward direction and rearwardly of said header for receiving said harvested crop material being delivered rearwardly by said header and conditioning said crop material as it moves rearwardly into a bite defined between said rolls.

10. The machine as recited in claim 7, wherein said header includes an elongated flexible floor across which said crop material is delivered rearwardly, said floor being pivotal about an axis defined along its forward longitudinal edge; and a pair of links, each link being fixed to one of said lower links and pivotally connected to said floor for pivoting said floor about its axis and thereby maintaining said floor aligned with said bite of said rolls, whereby said harvested crop material will be delivered to said bite of said rolls although said header floatingly follows uneven field contours as said mobile frame moves across the field.

11. A crop harvesting machine, comprising:

a mobile frame adapted to move across a field in a forward direction;

an elongated header disposed forwardly of said frame for harvesting crop material from the field and for delivering said crop material rearwardly as said mobile frame advances forwardly, said heater including an elongated flexible floor across which said crop material is delivered rearwardly, said floor being pivotal about an axis defined along its forward longitudinal edge;

a pair of upper and lower elongated rolls generally horizontally mounted on said frame rearwardly of said header for receiving said harvested crop material being delivered rearwardly by said header and conditioning said crop material as it moves rearwardly into a bite defined between said rolls;

means for suspending said header from said frame so as to allow said header to move in a generally vertical direction and thereby floatingly follow the contour of the field as said frame moves across the field, said means including spaced apart lower links pivotally interconnecting respective lower portions of said header and lower parts to said frame; and a plurality of links, each link being fixed to one of said lower links and pivotally connected to said header floor for pivoting said floor about its axis and thereby maintaining said floor aligned with said bite of said rolls, whereby said harvested crop material will be delivered to said bite of said rolls although said header floatingly follows uneven field contours as said frame moves across the field.

*12. A crop harvesting machine, comprising:*

*a mobile frame adapted to move across a field in a forward direction;*

*an elongated header disposed forwardly of said frame and extending transversely to said forward direction for harvesting crop material from the field and delivering said crop material rearwardly as said mobile frame advances forwardly;*

*a pair of upper and lower elongated rolls generally horizontally mounted on said frame rearwardly of said header, not weight bearing upon said lower links set forth below, for receiving said harvested crop material being delivered rearwardly by said header and conditioning said crop material as it moves rearwardly into the bite defined between said rolls; and*

*means for suspending said header from said frame for substantially complete independent movement of said header during field operation relative to said frame and rolls, said means for suspending including a pair*

*of spaced apart lower links respectively pivotally interconnecting corresponding lower opposite lateral end portions of said header and said frame, each one of said lower links being pivotally movable independently of the other, a pair of spaced apart upper links respectively pivotally interconnecting corresponding upper opposite lateral end portions of said header and said frame, each one of said upper links being pivotally mounted on said frame for movement independent of the other, and resilient means connected to said frame and operably supporting the lateral end portions of said header so as to counterbalance the weight of a respective one of said opposite lateral end portions of said header and thereby support said respective one lateral end portion of said header in an operating position relative to the field while at the same time enabling said respective one lateral end portion of said header to vertically move relative to the other lateral end portion thereof and floatingly follow the contour of the field as said mobile frame moves across the field.*

*13. The machine as recited in claim 12 wherein:*

*each of said upper links includes a front and a rear portion which respectively extend forwardly and rearwardly from the pivot connection thereof to said frame, said front portion pivotally connected to a respective lateral end portion of said header; and*

*said resilient means comprises a pair of spring means each of which interconnect a respective rear portion of one of said upper links with said frame.*

*14. The machine as recited in claim 13, wherein:*

*said header further includes an elongated flexible floor across which said crop material is delivered rearwardly, said floor being pivotable about an axis defined along its forward longitudinal edge.*

*15. A crop harvesting machine comprising:*

*a mobile frame adapted to move across a field in a forward direction;*

*an elongated header disposed forwardly of said frame and extending transversely to said forward direction for harvesting crop material from the field as said mobile frame advances forwardly;*

*a pair of spaced apart lower links respectively pivotally interconnecting corresponding lower opposite lateral end portions of said header and said frame, each one of said lower links being pivotally movable independently of the other;*

*a pair of spaced apart upper links respectively pivotally interconnecting corresponding upper opposite lateral end portions of said header and said frame, each one of said upper links being pivotally mounted on said frame for movement independent of the other;*

*resilient means connected to said frame and operably supporting the lateral end portions of said header so as to counterbalance the weight of a respective one of said opposite lateral end portions of said header and thereby support said respective one lateral end portion of said header in an operating position relative to the field, while at the same time enabling said respective one lateral end portion of said header to vertically move relative to the other lateral end portion thereof and said frame and said rolls mentioned below and floatingly follow the contour of the field as said mobile frame moves across the field; and*

*a pair of upper and lower elongated rolls generally horizontally mounted on said frame transversely to said forward direction and rearwardly of said header, not weight bearing upon said lower links, to receive harvested crop material being delivered rearwardly by said header and condition said crop material as it moves rearwardly into the bite defined between said rolls, whereby said header, during field operation, moves substantially completely independently of said frame and rolls.*

*16. The machine as recited in claim 15 wherein:*

*each of said upper links includes a front and a rear portion which respectively extend forwardly and rearwardly from the pivot connection thereof to said frame, said front portion pivotally connected to a respective lateral end portion of said header; and*

*said resilient means comprises a pair of spring means each of which interconnect a respective rear portion of one of said upper links with said frame.*

*17. The machine of claim 16 wherein:*

*said header further includes an elongated flexible floor across which said crop material is delivered rearwardly, said floor being pivotable about an axis defined along its forward longitudinal edge.*

* * * * *